(12) United States Patent
Sanchez

(10) Patent No.: US 11,725,717 B1
(45) Date of Patent: Aug. 15, 2023

(54) TORQUE CONVERTER DAMPER ASSEMBLY

(71) Applicant: Schaeffler Technologies AG & Co. KG, Herzogenaurach (DE)

(72) Inventor: Alberto Jared Sanchez, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/875,576

(22) Filed: Jul. 28, 2022

(51) Int. Cl.
*F16H 45/02* (2006.01)
*F16F 15/134* (2006.01)
*F16F 15/123* (2006.01)

(52) U.S. Cl.
CPC .......... *F16H 45/02* (2013.01); *F16F 15/1234* (2013.01); *F16F 15/13484* (2013.01); *F16H 2045/0226* (2013.01); *F16H 2045/0294* (2013.01)

(58) Field of Classification Search
CPC ... F16H 45/02; F16H 2045/0273–0294; F16H 2045/0221–0231; F16F 15/1217–1219; F16F 15/12313–1234; F16F 15/121; F16F 15/1213; F16F 15/1216; F16F 15/12346
See application file for complete search history.

(56) References Cited

U.S. PATENT DOCUMENTS

| | | | |
|---|---|---|---|
| 5,622,244 A * | 4/1997 | Hansen | F16D 47/06 192/208 |
| 6,354,420 B1 * | 3/2002 | Yabe | F16H 45/02 29/469 |
| 8,708,118 B2 * | 4/2014 | Steinberger | F16H 45/02 192/55.61 |
| 9,303,747 B2 * | 4/2016 | Mototsune | F16D 25/0635 |
| 9,732,835 B2 * | 8/2017 | Kawahara | F16F 15/12353 |
| 10,066,719 B2 | 9/2018 | Hague | |
| 10,352,423 B2 * | 7/2019 | Cai | F16H 61/148 |
| 10,808,820 B2 * | 10/2020 | Sung | F16D 13/683 |
| 2014/0008174 A1 * | 1/2014 | Tomiyama | F16D 3/14 192/203 |
| 2022/0412434 A1 * | 12/2022 | Lee | F16F 15/12346 |

* cited by examiner

Primary Examiner — Ernesto A Suarez
Assistant Examiner — James J Taylor, II

(57) ABSTRACT

A torque converter includes a front cover arranged to receive a torque. The torque converter further includes a lock-up clutch engaged with the front cover and including a clutch plate. The torque converter further includes a damper assembly engageable with the lock-up clutch. The damper assembly includes a cover plate defining a spring retainer extending about an axis. The damper assembly further includes a spring disposed in the spring retainer. The damper assembly further includes a spring support plate fixed to the cover plate. The spring support plate includes inner tabs and outer tabs disposed radially outside of the inner tabs. The outer tabs are configured to radially constrain the spring in the spring retainer. The inner tabs are configured to position the clutch plate relative to the axis.

20 Claims, 4 Drawing Sheets

TORQUE CONVERTER DAMPER ASSEMBLY

TECHNICAL FIELD

The present disclosure relates generally to a torque converter, and more specifically to a damper assembly for the torque converter.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a cover of the torque converter to bypass the fluid coupling. In some torque converter arrangements, the torque converter may include a damper assembly having springs and a spring support plate supporting the springs and positioning a component of the lock-up clutch. In such arrangements, a thickness of the spring support plate may be limited by placement of the springs and the component of the lock-up clutch such that the spring support plate can constrain the springs and position the component.

SUMMARY

Embodiments disclosed herein provide a torque converter including a front cover arranged to receive a torque. The torque converter further includes a lock-up clutch engaged with the front cover and including a clutch plate. The torque converter further includes a damper assembly engageable with the lock-up clutch. The damper assembly includes a cover plate defining a spring retainer extending about an axis. The damper assembly further includes a spring disposed in the spring retainer. The damper assembly further includes a spring support plate fixed to the cover plate. The spring support plate includes inner tabs and outer tabs disposed radially outside of the inner tabs. The outer tabs are configured to radially constrain the spring in the spring retainer, and the inner tabs are configured to position the clutch plate relative to the axis.

In embodiments, the spring support plate may include a stopper arranged in the spring retainer and configured to circumferentially constrain the spring in the spring retainer. Each outer tab may be disposed circumferentially between one respective inner tab and the stopper. In embodiments, the inner tabs may extend axially outward of the outer.

In embodiments, the spring support plate may extend partially about the axis. The torque converter may include a further spring support plate fixed to the cover plate and extending partially about the axis. The further spring support plate may be circumferentially aligned with the spring support plate. The further spring support plate may include further inner tabs and further outer tabs disposed radially outside of the further inner tabs. The further outer tabs may radially constrain the spring in the spring retainer, and the further inner tabs may be configured to position the clutch plate relative to the axis. The further spring support plate may be circumferentially spaced from the spring support plate. The further spring support plate may include two ends circumferentially spaced from each other. Each further inner tab may be disposed at one respective end. Each inner tab may be disposed circumferentially between one further inner tab and one outer tab. The spring support plate may include two ends circumferentially spaced from each other. Each inner tab may be disposed at one respective end.

In embodiments, the inner tabs may be circumferentially spaced from each other. In embodiments, the outer tabs may be circumferentially spaced from each other. In embodiments, the outer tabs may be disposed circumferentially between the inner tabs. In embodiments, the inner tabs may be configured to center the clutch plate on the axis.

Embodiments of this disclosure further provide a damper assembly for a torque converter including a cover plate defining a spring retainer extending about an axis. The damper assembly further includes a spring disposed in the spring retainer. The damper assembly further includes a spring support plate fixed to the cover plate. The spring support plate includes inner tabs and outer tabs disposed radially outside of the inner tabs. The outer tabs are configured to radially constrain the spring in the spring retainer, and the inner tabs are disposed radially inside of the spring retainer.

In embodiments, the inner tabs may extend axially outward of the outer tabs. In embodiments, the inner tabs may be circumferentially spaced from each other. In embodiments, the outer tabs may be disposed circumferentially between the inner tabs. In embodiments, the spring support plate may extend partially about the axis. The spring support plate may include two ends circumferentially spaced from each other. Each inner tab may be disposed at one respective end. In embodiments, the outer tabs may be circumferentially spaced from each other.

Instead of having a thickness of a spring support plate be such that a tab on an outer circumference of the spring support plate can support springs and position a lock-up clutch component, embodiments described herein include a spring support plate having inner tabs disposed radially inside of outer tabs, which allows the spring support plate to retain springs via the outer tabs and position a lock-up clutch component via the inner tabs. Such an arrangement allows the thickness of the spring support plate to be reduced, e.g., by a distance equal to a radial offset between the inner and outer tabs, which reduces weight of the torque converter and can improve fuel economy.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale;

some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
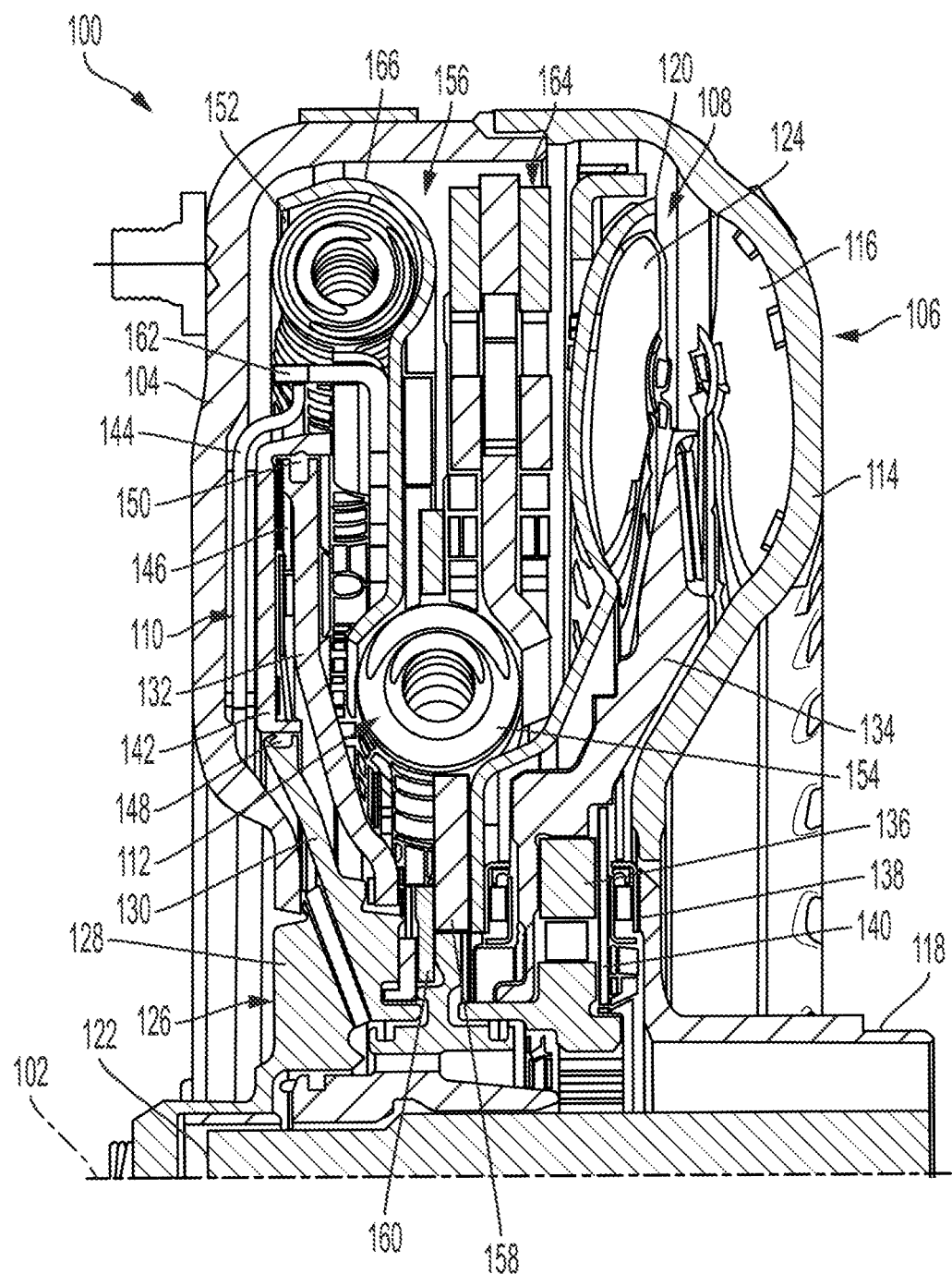
FIG. 1 illustrates a cross-sectional view of a portion of a torque converter according to an example aspect of the present disclosure.

Referring to FIG. 1, a portion of a torque converter 100 is illustrated according to one embodiment of the present disclosure. At least some portions of the torque converter 100 are rotatable about a central axis 102. While only a portion of the torque converter 100 above the central axis 102 is shown in FIG. 1, it should be understood that the torque converter 100 can appear substantially similar below the central axis 102 with many components extending about the central axis 102. Words such as "axial," "radial," "circumferential," "outward," etc. as used herein are intended to be with respect to the central axis 102.

The torque converter 100 includes: a front cover 104 arranged to receive a torque; an impeller 106; a turbine 108; a lock-up clutch 110; and a damper assembly 112. The impeller 106 includes: an impeller shell 114 non-rotatably connected to the front cover 104 such that the impeller 106 rotates as the front cover 104 rotates, at least one impeller blade 116 attached to an inner surface of the impeller shell 114, and an impeller hub 118 attached to a radially inner end of the impeller shell 114. The turbine 108 includes a turbine shell 120 and at least one turbine blade 124 attached to the turbine shell 120. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The torque converter 100 may include a cover hub 126 fixed to the front cover 104, e.g., via welding. The cover hub 126 is sealed to a hub (not numbered), which is non-rotatably connected to a transmission input shaft 122, e.g., via a spline connection. The cover hub 126 includes a body 128 and a pedestal 130 extending radially outward from the body 128. The torque converter 100 may include a seal plate 132 fixed, e.g., at an inner diameter thereof, to the cover hub 126, e.g., via welding. The pedestal 130 may be disposed axially between the seal plate 132 and the front cover 104.

The torque converter 100 may include a stator 134 disposed axially between the impeller 106 and the turbine 108 to redirect fluid flowing from the turbine blade 124 before the fluid reaches the impeller 106 to increase an efficiency of torque converter 100. For example, the impeller blade 116, when rotated about the central axis 102, pushes the fluid outwardly. The fluid pushes against the turbine 108 of the torque converter 100, causing the turbine 108 to revolve about the central axis 102. The stator 134 functions to return the fluid from the turbine 108 back to the impeller 106 with minimal or no power loss. Drive power is transmitted from the turbine 108 to the transmission input shaft 122. The torque converter 100 may, for example, further include: a one-way clutch 136 disposed within stator 134, a thrust bearing 138 disposed axially between the stator 134 and the impeller shell 114, and a side plate 140 configured to retain the one-way clutch 136 within the stator 134.

Power from a vehicle engine (not shown) can be transmitted to a transmission (not shown) via fluid, and via the torque converter 100. In particular, the power may first be transmitted to the front cover 104 of the torque converter 100. The lock-up clutch 110 is configured to selectively transfer torque from the front cover 104 to the damper assembly 112. The lock-up clutch 110 includes a piston 142 and a clutch plate 144.

The piston 142 may be disposed between the front cover 104 and the seal plate 132. The piston 142 may be supported by the pedestal 130 and the seal plate 132. The clutch plate 144 may be disposed between the piston 142 and the front cover 104. The clutch plate 144 may be engaged with the damper assembly 112 (as discussed further below).

The piston 142 engages or closes the lock-up clutch 110 in response to the pressurization of a medium (e.g., fluid such as oil) in a piston apply chamber 146 defined between the pedestal 130, the seal plate 132, and the piston 142. During axial movement of the piston 142, the piston 142 slides along the pedestal 130. The piston 142 is sealed at an inner diameter to the pedestal 130 via seal 148. Additionally, the piston 142 is sealed to the seal plate 132 via seal 150. Seals 148, 150 maintain a fluid separation between the piston apply chamber 146 and the rest of the torque converter 100. The piston apply chamber 146 is further defined by, or bounded between the body 128, the pedestal 130, the seal 148, the piston 142, the seal 150, and the seal plate 132. By "bounded in part," we mean that a portion of the cited chamber, flow path, or other structure is bounded, or formed, by the cited element.

The damper assembly 112 may be configured to hydraulically transfer torque through the torque converter 100. The damper assembly 112 is positioned axially between the front cover 104 and the turbine 108 and is configured to transfer torque from the front cover 104 to the transmission input shaft 122. The damper assembly 112 includes: outer springs 152, inner springs 154 disposed radially inward of the outer springs 152, cover plates 156, 158 supporting the inner springs 154, an output flange 160, and a spring support plate 162.

The output flange 160 is disposed between the cover plates 156, 158. The output flange 160 may be connected to the cover plates 156, 158. The output flange 160 is connected to the transmission input shaft 122, e.g., via the hub, for torque transmission therebetween. The damper assembly 112 may include a centrifugal pendulum absorber 164. The centrifugal pendulum absorber 164 may, for example, be disposed at a radial outer end of the cover plate 158. As another example, the centrifugal pendulum absorber 164 may be disposed at a radial outer end of the output flange 160.

The cover plate 156 may support the inner springs 154 on one axial side. The cover plate 158 may support the inner springs 154 on another, opposite axial side. The cover plate 158 may be connected to the transmission input shaft 122, e.g., via the hub, for torque transmission therebetween. The cover plate 158 may be connected to the turbine shell 120.

The cover plate 156 includes a spring retainer 166 at a radial outer end thereof. The spring retainer 166 is formed by a rounded outer circumference of the cover plate 156. The spring retainer 166 is configured to receive the outer springs 152. That is, the cover plate 156 houses the outer springs 152 in the spring retainer 166.

The spring support plate 162 is fixed to the cover plate 156, e.g., via a fastener such as a rivet or the like. The spring support plate 162 is disposed axially between the cover plate 156 and the front cover 104. The spring support plate 162 is configured to retain the outer springs 152 in the spring retainer 166 and to engage the clutch plate 144, as discussed further below.

The damper assembly 112 may include any suitable number of spring support plates 162, e.g., one or more. In the example embodiment shown in FIG. 2, the damper assembly 112 may include a plurality of spring support plates 162 arranged about the central axis 102. In such an example, the plurality of spring support plates 162 may be spaced from each other circumferentially about the central axis 102. The damper assembly 112 may, for example, include a same number of spring support plates 162 as outer springs 152.

The spring support plates 162 may be substantially identical to each other. For example, the spring support plates 162 may be formed via a common process (e.g., stamping) and according to common manufacturing/design requirements (e.g., dimensions, tolerances, etc.)

Figure 2:
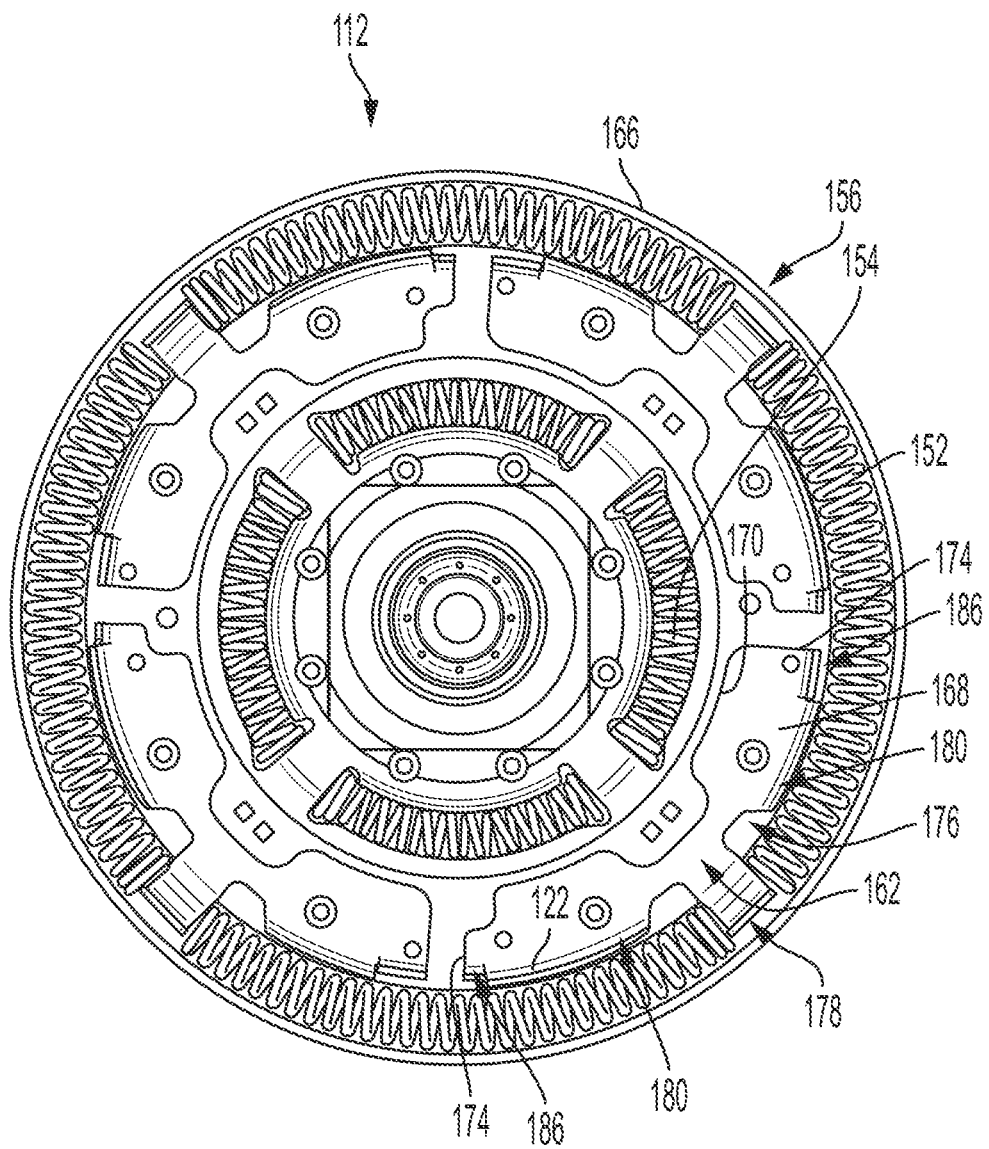
FIG. 2 illustrates a front view of a damper assembly according to an example aspect of the present disclosure.
Figure 3:
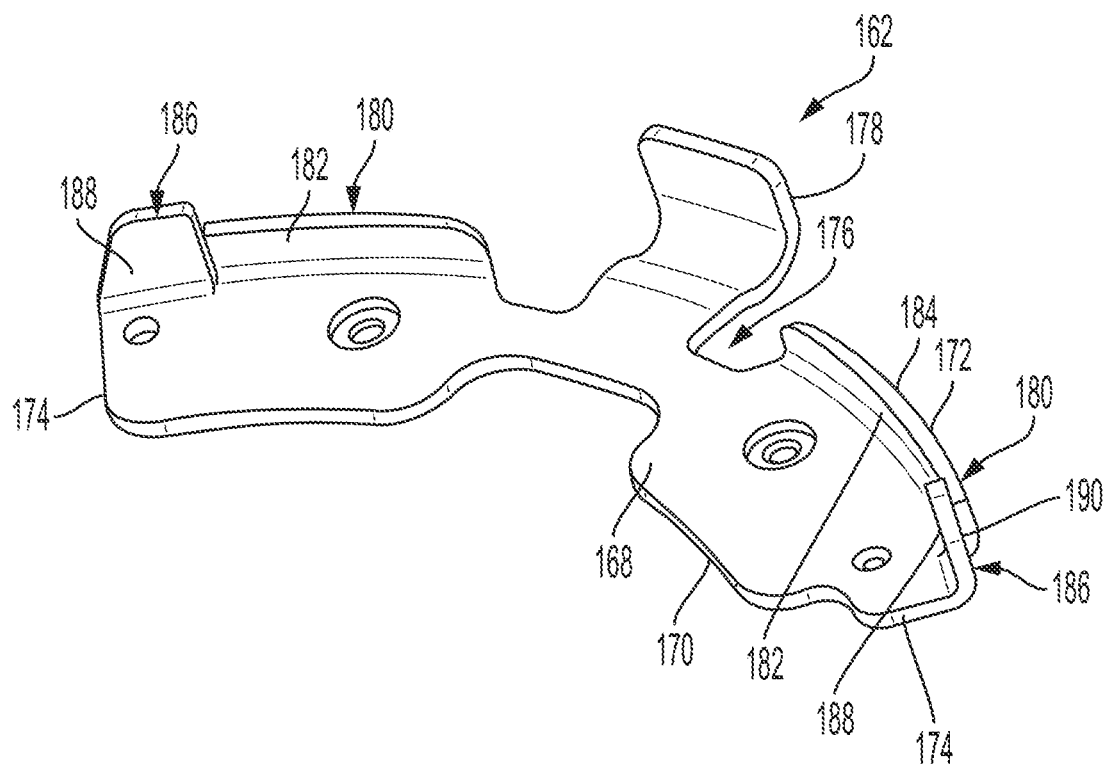
FIG. 3 illustrates a perspective view of a spring support plate according to an example aspect of the present disclosure.

Referring to FIGS. 2-3, the spring support plate 162 includes a body 168 extending partially circumferentially about the central axis 102. The body 168 includes an inner side 170 radially spaced from the central axis 102 and an outer side 172 disposed radially outward of the inner side 170. The inner side 170 and the outer side 172 each extend partially circumferentially about the central axis 102. The spring support plate 162 includes two ends 174 circumferentially spaced from each other about the central axis 102.

The spring support plate 162 may include a groove 176 extending radially inward from the outer side 172. The spring support plate 162 may include a stopper 178 extending radially outward from the groove 176. The stopper 178 may extend into the spring retainer 166. The stopper 178 may be configured to circumferentially retain the outer springs 152 in the spring retainer 166. Additionally, the stopper 178 may transfer torque between the spring support plate 162 and the outer springs 152.

The spring support plate 162 includes an outer tab 180 arranged on the outer side 172. The outer tab 180 extends axially towards the clutch plate 144. The outer tab 180 includes an inner surface 182 and an outer surface 184 disposed radially outside of the inner surface 182. The outer tab 180, e.g., the inner surface 182 and the outer surface 184, extends partially circumferentially about the central axis 102. The outer surface 184 is configured to radially constrain at least one of the outer springs 152. That is, the outer surface 184 retains at least one of the outer springs 152 in the spring retainer 166. For example, the outer surface 184 may abut, i.e., contact, at least one of the outer springs 152 in the spring retainer 166.

The spring support plate 162 includes a plurality of inner tabs 186 circumferentially spaced from each other about the central axis 102. Each inner tab 186 may be disposed at one respective end 174 of the spring support plate 162. The inner tabs 186 are radially aligned with each other relative to the central axis 102.

In the embodiment shown in FIGS. 2-3, the spring support plate 162 includes two outer tabs 180 circumferentially spaced from each other. Each outer tab 180 may be disposed circumferentially between the stopper 178 and one respective inner tab 186. The outer tabs 180 are radially aligned with each other relative to the central axis 102. In an example in which the spring support plate 162 lacks the stopper 178 (i.e., another component such as the clutch plate 144 includes the stopper 178), the spring support plate 162 may include one outer tab 180 disposed between the inner tabs 186.

The inner tabs 186 include an inner surface 188 and an outer surface 190 disposed radially outside of the inner surface 188. The inner tabs 186 are disposed radially inside of the outer tabs 180. That is, the outer surfaces 190 of the inner tabs 186 are disposed radially inside of the outer surfaces 184 of the outer tabs 180, e.g., by a distance equal to a thickness (e.g., determined along the central axis 102) of the spring support plate 162. The outer surfaces 190 of the inner tabs 186 may be radially aligned with the inner surfaces 182 of the outer tabs 180.

Each inner tab 186 may be circumferentially aligned with the outer tab 180 disposed between the stopper 178 and the respective inner tab 186. In such an example, a circumferential side of the respective inner tab 186 may be arranged in a common plane with a circumferential side of the outer tab 180 disposed between the stopper 178 and the respective inner tab 186. Alternatively, the inner tabs 186 may be circumferentially spaced from the outer tabs 180.

The inner tabs 186 extend axially towards the clutch plate 144. The inner tabs 186 may extend axially outward of the outer tabs 180. That is, the inner tabs 186 may extend farther along the central axis 102 than the outer tabs 180, e.g., by the distance equal to the thickness of the spring support plate 162.

The inner tabs 186 are configured to position the clutch plate 144 relative to the central axis 102. That is, the plurality of spring support plates 162 are arranged to radially constrain the clutch plate 144. Specifically, the inner surfaces 188 are spaced about the central axis 102 to center the clutch plate 144 on the central axis 102. Additionally, the clutch plate 144 may be engaged with the plurality of spring support plates 162 via a tabbed connection. For example, the clutch plate 144 may include one or more tabs (not numbered) configured to be received between circumferentially adjacent spring support plates 162. In such an example, the tabs may engage respective inner tabs 186 of the circumferentially adjacent spring support plates 162 to transfer torque from the clutch plate 144 to the spring support plates 162.

Figure 4:
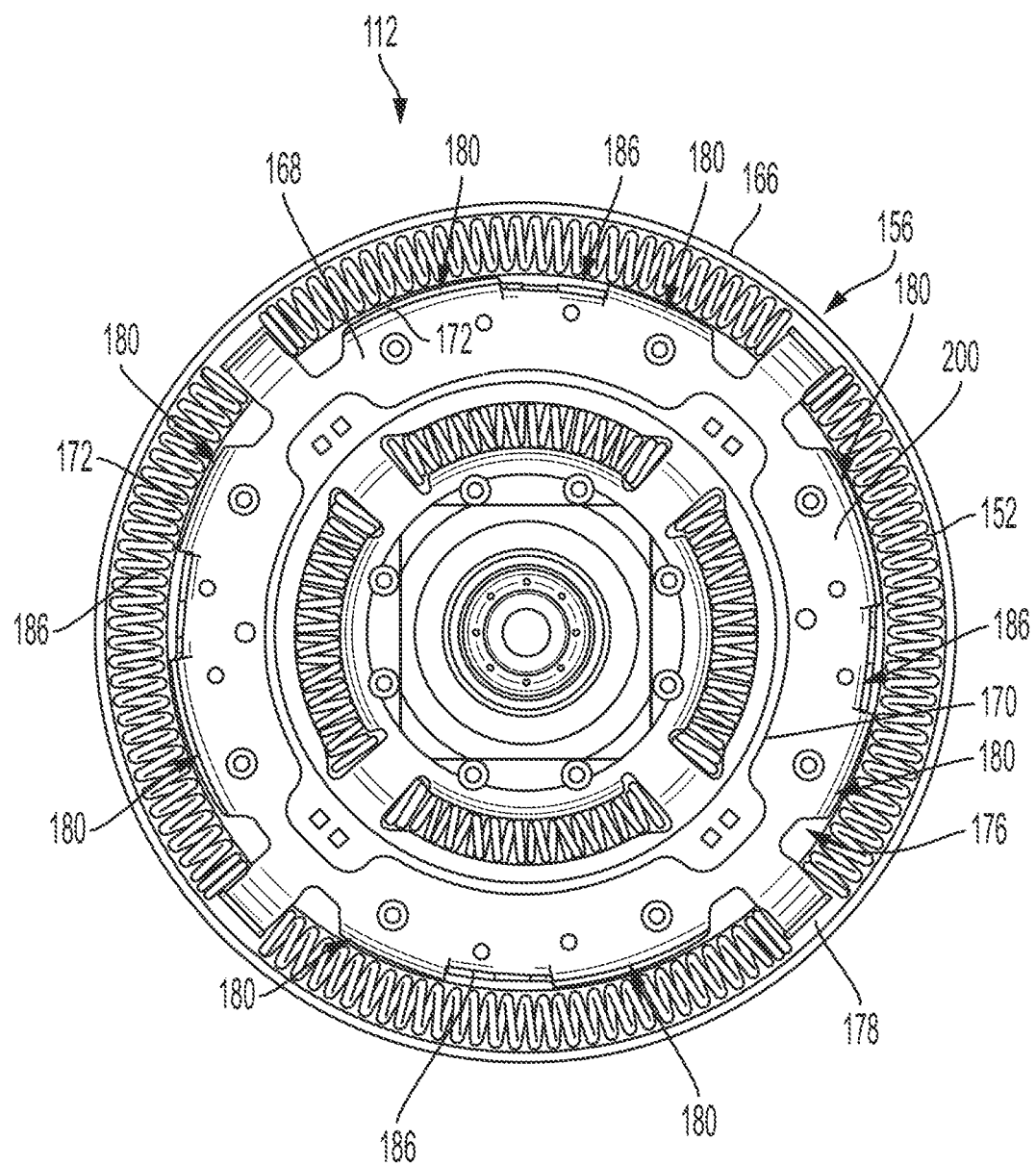
FIG. 4 illustrates a front view of a damper assembly according to another example aspect of the present disclosure

Referring to FIG. 4, the embodiment shown in FIG. 4 differs from the embodiment shown in FIG. 3 in that the embodiment of FIG. 4 includes a spring support plate 200 that is monolithic, i.e., a single-piece construction, and includes the features of the plurality of spring support plates 162 shown in FIGS. 2-3 except for the ends 174. In such an example, the damper assembly 112 includes one spring support plate 162 having a body 168 that extends entirely about the central axis 102. In other words, the body 168 may extend annularly about the central axis 102.

In this example, each inner tab 186 is disposed circumferentially between one other inner tab 186 and one of the outer tabs 180. The inner tabs 186 may be arranged such that pairs of circumferentially adjacent inner tabs 186 are equally spaced about the central axis 102. The tabs of the clutch plate 144 may engage the respective pairs of circumferentially adjacent inner tabs 186 to transfer torque from the clutch plate 144 to the spring support plate 200. The spring support plate 200 is configured to retain the outer springs 152 in the spring retainer 166 while positioning the clutch plate 144 relative to the central axis 102, which allows for a reduction in a thickness of the spring support plate 200 as compared to a plate lacking inner tabs 186 disposed radially inside of outer tabs 180.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Torque converter
102 Central axis
104 Front cover
106 Impeller
108 Turbine
110 Lock-up clutch
112 Damper assembly
114 Impeller shell
116 Impeller blade
118 Impeller hub
120 Turbine shell
122 Transmission input shaft
124 Turbine blade
126 Cover hub
128 Body
130 Pedestal
132 Seal plate
134 Stator
136 One-way clutch
138 Thrust bearing
140 Side plate
142 Piston
144 Clutch Plate
146 Piston apply chamber
148 Seal
150 Seal
152 Outer springs
154 Inner springs
156 Cover plate
158 Cover plate
160 Output flange
162 Spring support plate
164 Centrifugal pendulum absorber
166 Spring retainer
168 Body
170 Inner side
172 Outer side
174 End
176 Groove
178 Stopper
180 Outer tab
182 Inner surface
184 Outer surface
186 Inner tab
188 Inner surface
190 Outer surface
200 Spring support plate

What is claimed is:

1. A torque converter, comprising:
a front cover arranged to receive a torque;
a lock-up clutch engaged with the front cover and including a clutch plate; and
a damper assembly engageable with the lock-up clutch, the damper assembly including:
a cover plate defining a spring retainer extending about an axis;
a plurality of springs disposed in the spring retainer and circumferentially spaced from each other; and
a spring support plate fixed to the cover plate, the spring support plate including inner tabs extending axially away from the spring support plate and outer tabs disposed radially outside of the inner tabs and extending axially away from the spring support plate;
wherein the outer tabs are configured to radially constrain the springs in the spring retainer, and the inner tabs are configured to radially constrain an outer diameter of the clutch plate;
wherein the spring support plate includes a stopper arranged in the spring retainer and configured to circumferentially constrain the springs in the spring retainer, each outer tab being disposed circumferentially between one respective inner tab and the stopper.

2. The torque converter of claim 1, wherein the inner tabs extend axially outward of the outer tabs.

3. The torque converter of claim 1, wherein the spring support plate extends partially about the axis.

4. The torque converter of claim 3, further comprising a further spring support plate fixed to the cover plate and extending partially about the axis, the further spring support plate being circumferentially aligned with the spring support plate, wherein the further spring support plate includes:
further inner tabs extending axially away from the further spring support plate and further outer tabs disposed radially outside of the further inner tabs and extending axially away from the further spring support plate;
wherein the further outer tabs radially constrain at least one of the springs in the spring retainer, and the further inner tabs are configured to radially constrain the outer diameter of the clutch plate.

5. The torque converter of claim 4, wherein the further spring support plate is circumferentially spaced from the spring support plate.

6. The torque converter of claim 4, wherein the further spring support plate includes two ends circumferentially spaced from each other, each further inner tab being disposed at one respective end.

7. The torque converter of claim 4, wherein each inner tab is disposed circumferentially between one further inner tab and one outer tab.

8. The torque converter of claim 3, wherein the spring support plate includes two ends circumferentially spaced from each other, each inner tab being disposed at one respective end.

9. The torque converter of claim 1, wherein the inner tabs are circumferentially spaced from each other.

10. The torque converter of claim 1, wherein the outer tabs are circumferentially spaced from each other.

11. The torque converter of claim 1, wherein the outer tabs are disposed circumferentially between the inner tabs.

12. The torque converter of claim 1, wherein the inner tabs are configured to center the clutch plate on the axis.

13. A damper assembly for a torque converter, comprising:
- a cover plate defining a spring retainer extending about an axis;
- a plurality of springs disposed in the spring retainer and circumferentially spaced from each other; and
- a spring support plate fixed to the cover plate, the spring support plate including inner tabs extending axially away from the spring support plate and outer tabs disposed radially outside of the inner tabs and extending axially away from the spring support plate;
- wherein the outer tabs are configured to radially constrain the springs in the spring retainer, and the inner tabs are configured to radially constrain a component of a lock-up clutch;
- wherein each outer tab is arranged to contact an inner circumferential surface of one of the springs.

14. The damper assembly of claim 13, wherein the component is a clutch plate.

15. The damper assembly of claim 13, wherein the spring support plate extends partially about the axis.

16. The damper assembly of claim 13, further comprising a further spring support plate fixed to the cover plate and extending partially about the axis, the further spring support plate being circumferentially aligned with the spring support plate and circumferentially spaced from the spring support plate.

17. The damper assembly of claim 16, wherein the further spring support plate includes:
- further inner tabs extending axially away from the further spring support plate; and
- further outer tabs disposed radially outside of the further inner tabs and extending axially away from the spring support plate, the further outer tabs being configured to radially constrain at least one of the springs in the spring retainer, and the further inner tabs being configured to radially constrain the component of the lock-up clutch.

18. The damper assembly of claim 13, wherein the spring support plate includes a stopper arranged in the spring retainer and configured to circumferentially constrain the springs in the spring retainer, each outer tab being disposed circumferentially between one respective inner tab and the stopper.

19. A torque converter, comprising:
- a front cover arranged to receive a torque;
- a lock-up clutch engaged with the front cover and including a clutch plate; and
- a damper assembly engageable with the lock-up clutch, the damper assembly including:
  - a cover plate defining a spring retainer extending about an axis;
  - a plurality of springs disposed in the spring retainer and circumferentially spaced from each other;
  - a spring support plate fixed to the cover plate and extending partially about the axis, the spring support plate including inner tabs and outer tabs disposed radially outside of the inner tabs, wherein the outer tabs are configured to radially constrain the springs in the spring retainer, and the inner tabs are configured to position the clutch plate relative to the axis; and
  - a further spring support plate fixed to the cover plate and extending partially about the axis, the further spring support plate being circumferentially aligned with the spring support plate;
  - wherein the further spring support plate includes further inner tabs and further outer tabs disposed radially outside of the further inner tabs;
  - wherein the further outer tabs radially constrain at least one of the springs in the spring retainer, and the further inner tabs are configured to position the clutch plate relative to the axis.

20. The torque converter of claim 19, wherein the further spring support plate is circumferentially spaced from the spring support plate.

* * * * *